(12) United States Patent
Edge

(10) Patent No.: US 11,716,967 B2
(45) Date of Patent: Aug. 8, 2023

(54) DOG RUN ASSEMBLY

(71) Applicant: Aslan Edge, St. Charles, MO (US)

(72) Inventor: Aslan Edge, St. Charles, MO (US)

( * ) Notice: Subject to any disclaimer, the term of this patent is extended or adjusted under 35 U.S.C. 154(b) by 0 days.

(21) Appl. No.: 17/505,733

(22) Filed: Oct. 20, 2021

(65) Prior Publication Data

US 2023/0123789 A1    Apr. 20, 2023

(51) Int. Cl.
*A01K 1/04* (2006.01)

(52) U.S. Cl.
CPC ...................... *A01K 1/04* (2013.01)

(58) Field of Classification Search
CPC .......... A01K 1/04; A01K 1/06; A01K 15/027; A01K 15/04
USPC .................................. 119/784, 789
See application file for complete search history.

(56) References Cited

U.S. PATENT DOCUMENTS

| | | | |
|---|---|---|---|
| 2,222,409 A | 11/1940 | Gottlieb | |
| 3,395,675 A * | 8/1968 | Fowlkes | A01K 27/003 119/784 |
| 5,551,379 A * | 9/1996 | Hart | B60P 7/0823 119/797 |
| 5,718,190 A * | 2/1998 | Tinker | A01K 1/0272 119/784 |
| 5,852,988 A | 12/1998 | Gish | |
| 6,374,776 B2 * | 4/2002 | Adair | B60R 22/10 119/771 |
| 7,207,296 B2 | 4/2007 | DiDonato | |
| D569,050 S * | 5/2008 | Spater | D30/153 |
| 8,074,994 B1 * | 12/2011 | Delphia | F41J 7/02 211/119.16 |
| 8,567,349 B2 | 10/2013 | Wherley | |
| 10,653,115 B2 * | 5/2020 | Mowlds | A63F 9/0601 |
| 2003/0221635 A1 | 12/2003 | Fradette, II | |
| 2015/0096502 A1 * | 4/2015 | Weston | A01K 1/04 119/785 |
| 2016/0193535 A1 * | 7/2016 | Dose | B61B 7/00 104/113 |

FOREIGN PATENT DOCUMENTS

| | | | | |
|---|---|---|---|---|
| GB | 2060344 A | * | 5/1981 | ............... A01K 1/04 |
| WO | WO0067565 | | 11/2000 | |
| WO | WO-0067565 A1 | * | 11/2000 | ........... A01K 27/003 |

* cited by examiner

*Primary Examiner* — Timothy D Collins
*Assistant Examiner* — Maria E Graber

(57) ABSTRACT

A dog run assembly for preventing tangling of leads includes a pair of bars, a pair of lines, a pair of connectors, and a pair of fasteners. Each line is engaged to and extends between the bars. Each connector is rotationally engaged to a respective bar and can engage a respective vertical support element of a pair of vertical support elements so that the pair of lines is suspended between the vertical support elements. Each fastener is slidably engaged to a respective line so that the fastener is slidable between the bars. The fastener can engage a respective lead attached to an associated animal. The pair of bars rotates as a pair of animals tethered singly to the lines travel in opposing directions relative to the pair of lines. The lines and the leads attached to the animals remain untangled.

15 Claims, 4 Drawing Sheets

DOG RUN ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to dog run assemblies and more particularly pertains to a new dog run assembly for preventing tangling of leads. The present invention discloses a dog run assembly comprising a pair of lines extending between a pair of bars. The bars are rotatably engageable to vertical support elements so that leads engaged to the lines remain untangled.

(2) Description of Related Art Including Information Disclosed Under 37 CFR 1.97 and 1.98

The prior art relates to dog run assemblies. Prior art dog run assemblies may comprise ground mounted devices with a rotating element and single suspended cables to which multiple leads are attachable. What is lacking in the prior art is a dog run assembly comprising a pair of lines extending between a pair of bars. The bars are rotatably engageable to vertical support elements so that leads engaged to the lines remain untangled.

BRIEF SUMMARY OF THE INVENTION

An embodiment of the disclosure meets the needs presented above by generally comprising a pair of bars, a pair of lines, a pair of connectors, and a pair of fasteners. Each line is engaged to and extends between the bars. Each connector is rotationally engaged to a respective bar and is configured to engage a respective vertical support element of a pair of vertical support elements so that the pair of lines is suspended between the vertical support elements. Each fastener is slidably engaged to a respective line so that the fastener is slidable between the bars. The fastener is configured to engage a respective lead attached to an associated animal. The pair of bars is configured to rotate as a pair of animals tethered singly to the lines travel in opposing directions relative to the pair of lines. The lines and the leads attached to the animals remain untangled.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
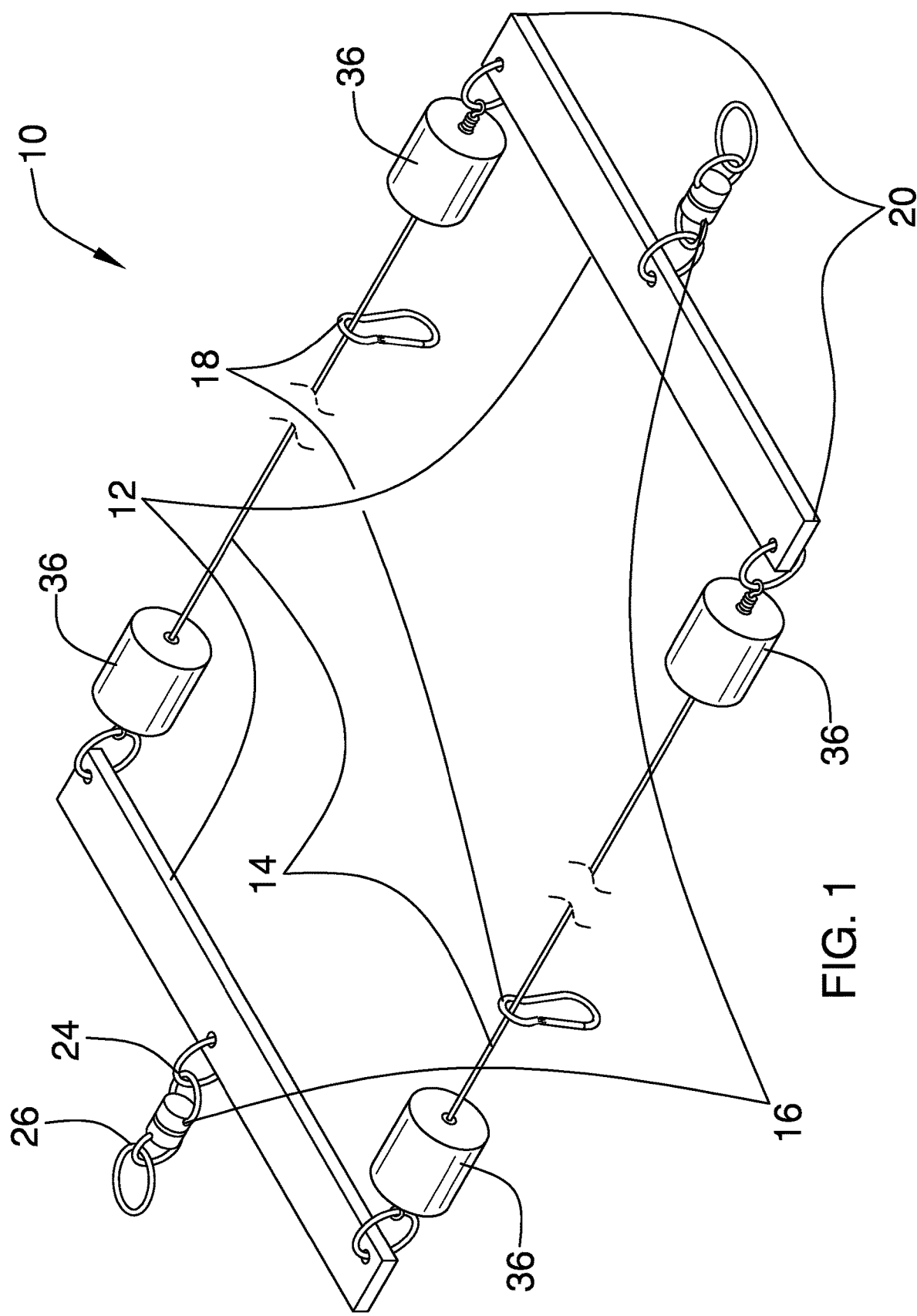
FIG. 1 is an isometric perspective view of a dog run assembly according to an embodiment of the disclosure.

With reference now to the drawings, and in particular to FIGS. 1 through 4 thereof, a new dog run assembly embodying the principles and concepts of an embodiment of the disclosure and generally designated by the reference numeral 10 will be described.

As best illustrated in FIGS. 1 through 4, the dog run assembly 10 generally comprises a pair of bars 12, a pair of lines 14, a pair of connectors 16, and a pair of fasteners 18. Each line 14 is engaged to and extends between the bars 12. The line 14 extends from proximate to a respective opposed end 20 of one of the bars 12 to proximate to a respective opposed end 20 of the other of the bars 12. The line 14 comprises wire, cable, cord, rope, or the like. The present invention anticipates the lines 14 being selectively length adjustable by methods known to those skilled in the art of length adjustable lines. As will become apparent, the lines 14 being length adjustable allows for the dog run assembly 10 to be configured for spaces of a variety of sizes.

Figure 4:
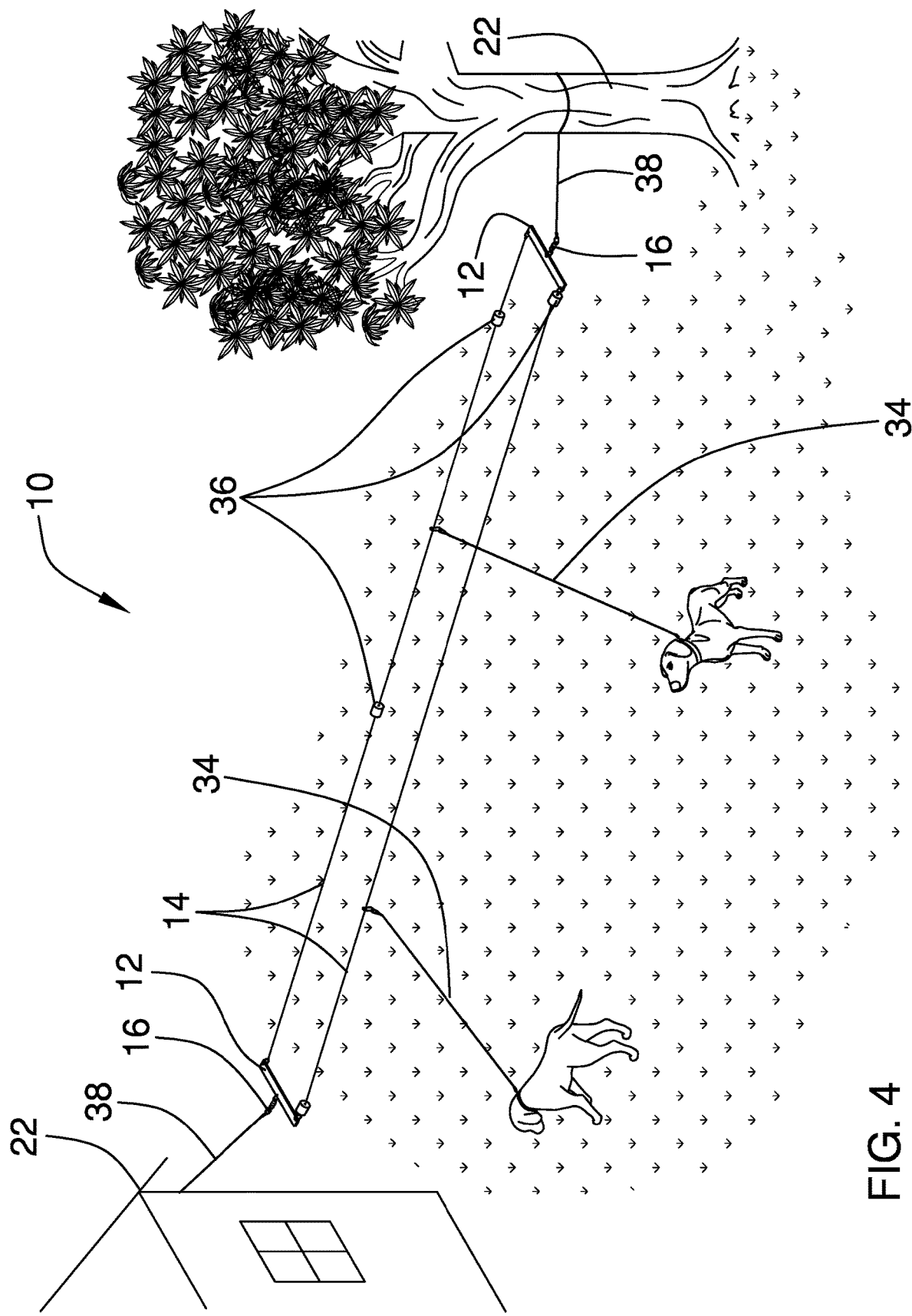
FIG. 4 is an in-use view of an embodiment of the disclosure.

Each connector 16 is rotationally engaged to a respective bar 12 and is configured to engage a respective vertical support element 22 of a pair of vertical support elements 22 so that the pair of lines 14 is suspended between the vertical support elements 22. As shown in FIG. 4, cables 38 are attached and extend between the vertical support elements 22 and the connectors 16. The connector 16 is positioned substantially equally distant from the opposed ends 20 of the bar 12.

Figure 2:
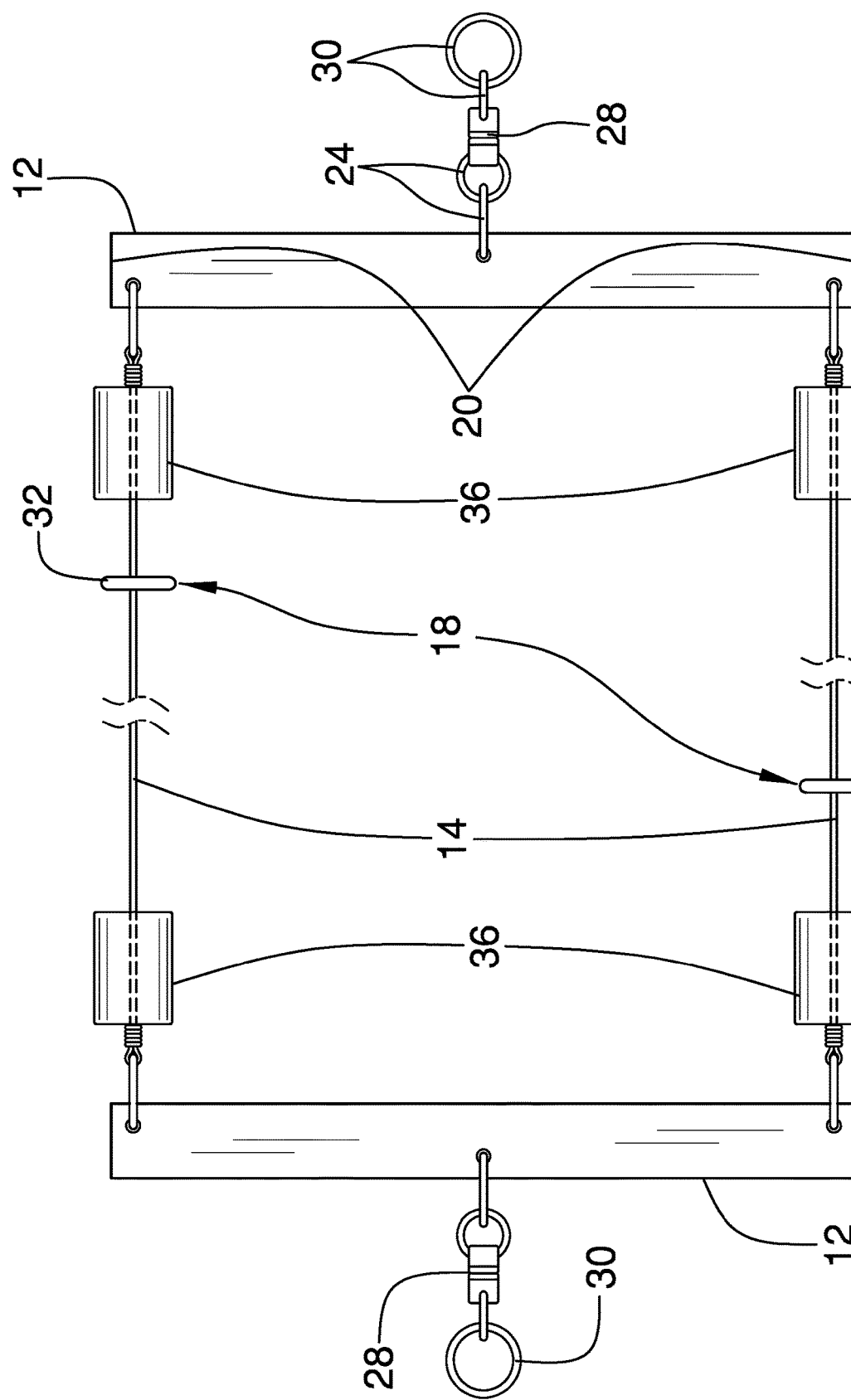
FIG. 2 is a detail view of an embodiment of the disclosure.

The connector 16 comprises a first element 24 and a second element 26. The first element 24 is engaged to the respective bar 12. The second element 26 is rotationally engaged to the first element 24 so that the respective bar 12 is rotatable relative to the respective vertical support element 22. A swivel 28 is engaged to and positioned between the first element 24 and the second element 26 so that the second element 26 is rotatable relative to the respective bar 12. The second element 26 may comprise a ring 30, as shown in FIG. 2. The present invention anticipates the connector 16 comprising other connecting means, such as, but not limited to, clips, carabiners, and the like.

Each fastener 18 is slidably engaged to a respective line 14 so that the fastener 18 is slidable between the bars 12. The fastener 18 may comprise a carabiner 32, as shown in FIG. 2, or other fastening means, such as, but not limited to, clips, rings, and the like. The fastener 18 is configured to engage a respective lead 34, such as a leash or a retractable leash, attached to an associated animal, as shown in FIG. 4. The pair of bars 12 is configured to rotate as a pair of animals tethered singly to the lines 14 travel in opposing directions relative to the pair of lines 14 so that the lines 14 and the leads 34 attached to the animals remain untangled.

Figure 3:
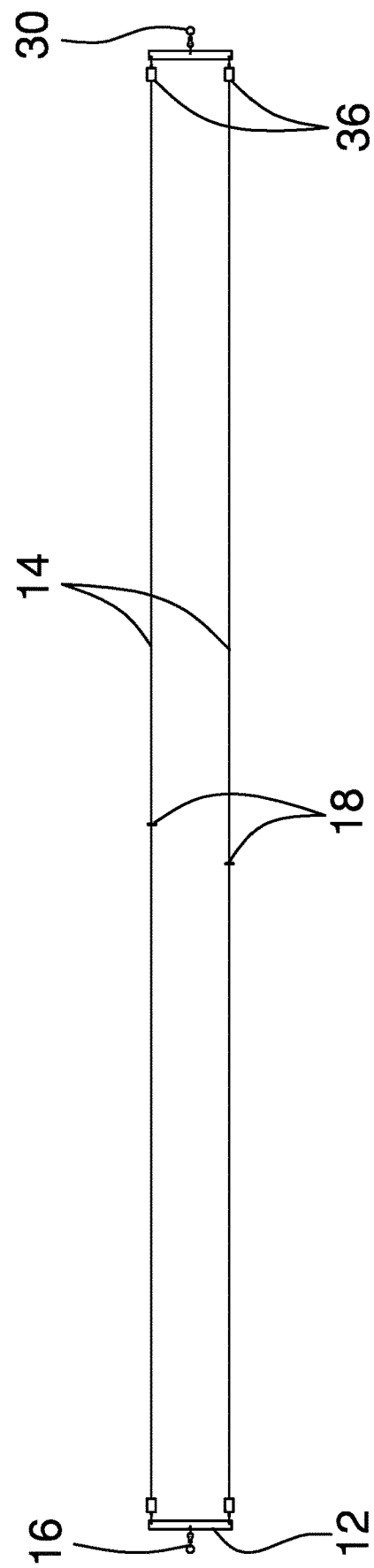
FIG. 3 is a top view of an embodiment of the disclosure.

The dog run assembly 10 also may comprises a plurality of stops 36. Each stop 36 is slidably engaged to a respective line 14. The stop 36 is configured to selectively engage the respective line 14 so that the stop 36 is fixedly positioned on the respective line 14 and positioned to restrict movement of an associated fastener 18 between the stop 36 and a respective bar 12. An animal tether by a lead 34 to the fastener 18 thus has its movement restricted. The plurality of stops 36 may comprise four stops 36 positioned two apiece on each line 14, as shown in FIG. 3. A respective fastener 18 positioned between the stops 36 positioned on an associated line 14 is restricted to sliding between the stops 36.

In use, the bars 12 are engaged to a pair of vertical support elements 22, such as a house and a tree, using the pair of connectors 16 and cables 38. The pair of lines 14 thus is suspended between the vertical support elements 22. The lead 34 of each animal then can be attached to a respective fastener 18. Should the animals tethered to the lines 14 travel in opposing directions relative to the pair of lines 14, the lines 14 and the leads 34 attached to the animals remain untangled.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A dog run assembly comprising:
a pair of bars;
a pair of lines, each line being engaged to and extending between the bars;
a pair of connectors, each connector being rotationally engaged to a respective bar and being configured for engaging a respective vertical support element of a pair of vertical support elements, such that the pair of lines is suspended between the vertical support elements;
a pair of fasteners, each fastener being slidably engaged to a respective line such that the fastener is slidable between the bars, the fastener being configured for engaging a respective lead attached to an associated animal, wherein the pair of bars is configured for rotating as a pair of animals tethered singly to the lines travel in opposing directions relative to the pair of lines, such that the lines and the leads attached to the animals remain untangled; and
wherein each connector comprises:
a first element engaged to the respective bar; and
a second element rotationally engaged to the first element, such that the respective bar is rotatable relative to the respective vertical support element.

2. The dog run assembly of claim 1, wherein each line comprises wire, cable, cord, or rope.

3. The dog run assembly of claim 1, further including:
the second element comprising a ring; and
a swivel engaged to and positioned between the first element and the second element, such that the second element is rotatable relative to the respective bar.

4. The dog run assembly of claim 1, wherein each fastener comprises a carabiner.

5. The dog run assembly of claim 1, wherein:
each line extends from proximate to a respective opposed end of one of the bars to proximate to a respective opposed end of the other of the bars; and
each connector is positioned substantially equally distant from the opposed ends of the respective bar.

6. The dog run assembly of claim 1, further including a plurality of stops, each stop being slidably engaged to a respective line, the stop being configured for selectively engaging the respective line, such that the stop is fixedly positioned on the respective line and positioned for restricting movement of an associated fastener between the stop and a respective bar.

7. The dog run assembly of claim 6, wherein the plurality of stops comprising four stops positioned two apiece on each line, such that a respective fastener positioned between the stops positioned on an associated line is restricted to sliding between the stops.

8. A dog run system comprising:
a pair of vertical support elements;
a pair of bars;
a pair of connectors, each connector being rotationally engaged to a respective bar and engaged to a respective vertical support element;
a pair of lines, each line being engaged to and extending between the bars, such that the pair of lines is suspended between the vertical support elements;
a pair of fasteners, each fastener being slidably engaged to a respective line such that the fastener is slidable between the bars;
a pair of leads, each lead being attached to a respective animal and engaged to a respective line by a respective fastener, such that the pair of bars is positioned for rotating as a pair of animals tethered singly to the lines travel in opposing directions relative to the pair of lines, such that the lines and the leads attached to the animals remain untangled; and
wherein each connector comprises:
a first element engaged to the respective bar; and a second element rotationally engaged to the first element, such that the respective bar is rotatable relative to the respective vertical support element.

9. The dog run system of claim 8, wherein each line comprises wire, cable, cord, or rope.

10. The dog run system of claim 8, further including:
the second element comprising a ring; and
a swivel engaged to and positioned between the first element and the second element, such that the second element is rotatable relative to the respective bar.

11. The dog run system of claim 8, wherein each fastener comprises a carabiner.

12. The dog run system of claim 8, wherein:
each line extends from proximate to a respective opposed end of one of the bars to proximate to a respective opposed end of the other of the bars; and
each connector is positioned substantially equally distant from the opposed ends of the respective bar.

13. The dog run system of claim 8, further including a plurality of stops, each stop being slidably engaged to a respective line, the stop being configured for selectively engaging the respective line, such that the stop is fixedly positioned on the respective line and positioned for restricting movement of an associated fastener between the stop and a respective bar.

14. The dog run system of claim 13, wherein the plurality of stops comprising four stops positioned two apiece on each line, such that a respective fastener positioned between the stops positioned on an associated line is restricted to sliding between the stops.

15. A dog run assembly comprising:
a pair of bars;
a pair of lines, each line being engaged to and extending between the bars, each line extending from proximate to a respective opposed end of one of the bars to proximate to a respective opposed end of the other of the bars, each line comprising wire, cable, cord, or rope;
a pair of connectors, each connector being rotationally engaged to a respective bar and being configured for engaging a respective vertical support element of a pair of vertical support elements, such that the pair of lines is suspended between the vertical support elements, each connector being positioned substantially equally distant from the opposed ends of the bar, each connector comprising:
a first element engaged to the respective bar,
a second element rotationally engaged to the first element, such that the respective bar is rotatable relative to the respective vertical support element, the second element comprising a ring, and
a swivel engaged to and positioned between the first element and the second element, such that the second element is rotatable relative to the respective bar;
a pair of fasteners, each fastener being slidably engaged to a respective line such that the fastener is slidable between the bars, the fastener being configured for engaging a respective lead attached to an associated animal, wherein the pair of bars is configured for rotating as a pair of animals tethered singly to the lines travel in opposing directions relative to the pair of lines, such that the lines and the leads attached to the animals remain untangled, the fastener comprising a carabiner; and
a plurality of stops, each stop being slidably engaged to a respective line, the stop being configured for selectively engaging the respective line, such that the stop is fixedly positioned on the respective line and positioned for restricting movement of an associated fastener between the stop and a respective bar, the plurality of stops comprising four stops positioned two apiece on each line, such that a respective fastener positioned between the stops positioned on an associated line is restricted to sliding between the stops.

\* \* \* \* \*